United States Patent [19]
Nakata

[11] Patent Number: 4,891,487
[45] Date of Patent: Jan. 2, 1990

[54] ELECTRODE RETURN CONTROL FOR ELECTRIC SPARK MACHINE

[75] Inventor: Masahiro Nakata, Aichi, Japan

[73] Assignee: Mitsubishi Denki Kabushiki Kaisha, Tokyo, Japan

[21] Appl. No.: 351,263

[22] Filed: May 10, 1989

[30] Foreign Application Priority Data

Feb. 21, 1986 [JP] Japan .................................. 61-35348

[51] Int. Cl.$^4$ .............................................. B23H 7/18
[52] U.S. Cl. .......................... 219/69.17; 204/129.25; 219/69.16; 219/69.2
[58] Field of Search ............... 219/69.16, 69.20, 69.13, 219/69.19, 69.17; 204/129.25, 224 M

[56] References Cited

U.S. PATENT DOCUMENTS

| | | | |
|---|---|---|---|
| 4,135,070 | 1/1979 | Pfau et al. | 219/69 G |
| 4,564,912 | 1/1986 | Schwefel | 219/69 G |
| 4,608,476 | 8/1986 | Shimizu | 219/69 V |
| 4,733,040 | 3/1988 | Pelloni et al. | 219/69 G |

FOREIGN PATENT DOCUMENTS 58-51021  3/1983  Japan .

Primary Examiner—M. H. Paschall
Assistant Examiner—Geoffrey S. Evans
Attorney, Agent, or Firm—Sughrue, Mion, Zinn, Macpeak and Seas

[57] ABSTRACT

An electrode return control system for an electric spark machine includes a first control mode in which, when a short-circuit condition occurs, an electrode is moved away from its position in a workpiece along a path over which the electrode was advanced for machining, and a second mode in which an object point to which the electrode is to be moved directly upon the occurrence of a short-circuit condition is updated with the machining progress.

3 Claims, 2 Drawing Sheets

ELECTRODE RETURN CONTROL FOR ELECTRIC SPARK MACHINE

This is a division of application Ser. No. 07/016,820, filed Feb. 20, 1987, now abandoned.

BACKGROUND OF THE INVENTION

The present invention relates to an electrode return control method for an electric spark machine.

Electric spark machines include wire-cut types in which a wire electrode is moved relative to a work to be cut along an instructed path, and types in which the electrode itself has a specific outer configuration and a work is machined to a configuration corresponding to the outer configuration of the electrode by moving the latter relative to the work.

FIG. 1 illustrates a machining operation of the latter type electric spark machine, in which an electrode 2 serving as a punch is supported by a spindle 3 and advanced in the arrow direction by a servo motor (not shown) to cut the work 1 to the shown configuration. A pulse voltage is applied from a power source 4 between the work 1 and the electrode 2, the work serving as a die. As a result, electric sparks are produced in a small gap between the electrode 2 and the work 1 upon which the latter is machined. By advancing the electrode 2 relative to the work 1 the latter is further machined corresponding to the outer configuration of the electrode 2. The region of the work 1 which is to be machined can be enlarged easily by controlling the pulse voltage or energy to be supplied to the gap or by moving the electrode 2 eccentrically with respect to the work 1.

In such spark machine as mentioned above, there may be a short-circuit when the electrode 2 comes in contact with the work 1 due to material particles removed from the work 1. In such case, the electrode 2 is moved away from a point at which the short-circuit occurs so that the short-circuit condition disappears and the material particles can be removed from the point in question. After these procedures are completed the electric spark machining operation is restarted.

In order to realize these procedures, it has been usual to return the electrode 2 along the path along which the preceding machining operation was performed. As another method for moving away the electrode, a point is preliminarily set and upon the occurrence of a signal indicative of such short-circuit the electrode is automatically returned to the preset point along the shortest path to the latter. This method is disclosed in Japanese Kokai No. 51021/1983.

According to the former method, when the electrode has a circular cross section and is advanced with respect to the work 1 to machine a round recess as shown in FIG. 2a, or when the electrode has a square cross section and is advanced along a rectangular path to machine a rectangular recess as shown in FIG. 2b, it is very difficult to remove a short-circuit condition if the electrode 2 is returned along the machining path, because the gap between the work 1 and the electrode 2 being returned is very close to the gap in which the short-circuit occurred.

In the preset point system disclosed in the afore-mentioned Japanese Kokai the electrode 2 is returned to a preset point A upon the occurrence of a short-circuit condition as shown in FIG. 2c, wherein the distance between the preset point A and the position of the electrode at which the short-circuit occurs increases with the depth of machining. That is, the return distance of the electrode 2 increases with the progress the machining, resulting in an increased time required for purposes other than actual machining. Consequently, the total machining time is increased. It may be possible to resolve this increased machining time by programming the machining process such that the preset point itself is updated with the progress of machining so as to make the amount of returning of the electrode substantially constant. However, it is clear that such programming is very complicated, causing other problems to appear.

SUMMARY OF THE INVENTION

An object of the present invention is to provide an electrode returning control method capable of removing a short-circuit condition immediately after an occurrence thereof to make a stable subsequent machining possible and capable of making a total machining time shorter than that required in the conventional system.

In order to achieve the above object, according to the present invention, a variable point is set which is updated successively regardless of the machining path and to which an electrode is straightly returned upon an occurrence of a short-circuit condition. The present system includes, in addition to the returning to the variable point, means for returning the electrode along its machining path so that the electrode can be returned along either a straight path or the machining path depending upon machining conditions employed for a specific case.

DETAILED DESCRIPTION OF THE PREFERRED EMBODIMETNS

Figure 1:
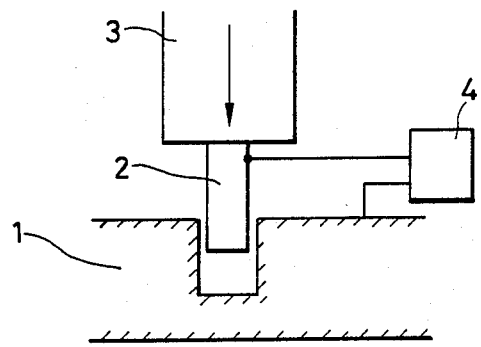
FIG. 1 shows a general construction of an electric spark machine schematically.
Figure 2A:
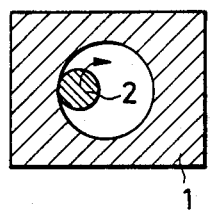
FIGS. 2a and 2b show examples of a conventional electrode returning system, respectively.
Figure 2B:
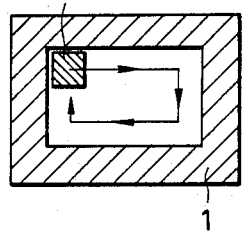
Figure 2C:
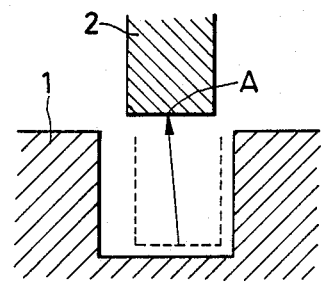
FIG. 2c shows another example fo the conventional electrode returning system schematically.
Figure 3A:
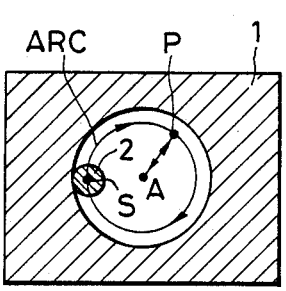
FIGS. 3a and 3b illustrate electrode returning systems of the present invention.
Figure 3B:
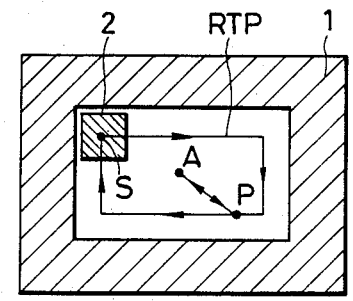

In FIGS. 3a and 3b which show examples of electrode returns according to the present invention, the electrodes to be returned having a circular cross section and a square cross section respectively, letters A, S and P depict a point to which the electrode is to be returned, a start point of machining, and a point at which a short-circuit signal is generated, respectively. The point A is variable and updated successively with the progress of the machining.

The electrode 2 is moved relative to a work 1 to be machined thereby along a circular path ARC or a rectangular path RTP from the start point S. When the short-circuit signal is generated at point P, the electrode 2 is returned toward point A until the short-circuit conditions are removed. When the short-circuit condition is removed by the return control of the electrode, the short-circuit signal disappears or an advance signal becomes high level, upon which the return movement of the electrode 2 is terminated. Thereafter, the electrode 2 is restarted to advance toward the point P and after the electrode 2 reaches the point P it is advanced along the path ARC or RTC as instructed to machine the work 1 again.

Figure 4:
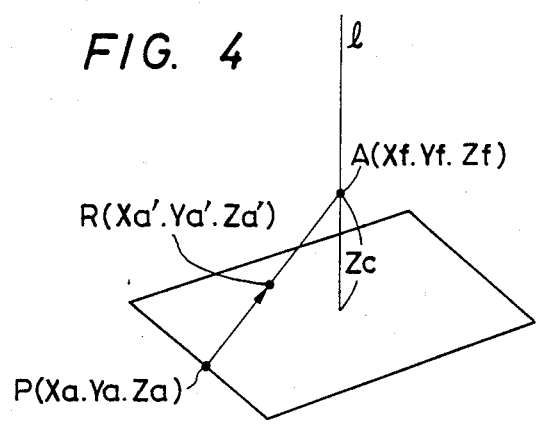
FIG. 4 is an explanatory illustration of the present electrode returning control system.

FIG. 4 illustrates how to determine the point A to which the electrode 2 is to be returned when the short-circuit occurs. In FIG. 4, coordinates $(X_f, Y_f, Z_f)$ of point A after the issuance of a preparatory function (G function in ISO standard) instruction for assigning a control mode, e.g., G73, can be determined by introducing a designed distance $Z_c$ to coordinates $(X_f, Y_f)$ of the point A in an X-Y plane which is given by $(X_f, Y_f)$ at the issuance of the G function instruction and calculating coordinates $(X_a, Y_a, Z_a)$ successively.

It may be necessary to control the return path of the electrode such that the latter moves back along an experienced path for machining. In such case, another G function, e.g., G72 is instructed so that the electrode can return along the experienced path upon an occurrence of a short-circuit signal after the issuance of the G72 instruction, and then move back to the point A according to the G73 instruction. The G72 and G73 instructions are modal such that the return control is performed according to either of them until the other instruction is given.

Figure 5:
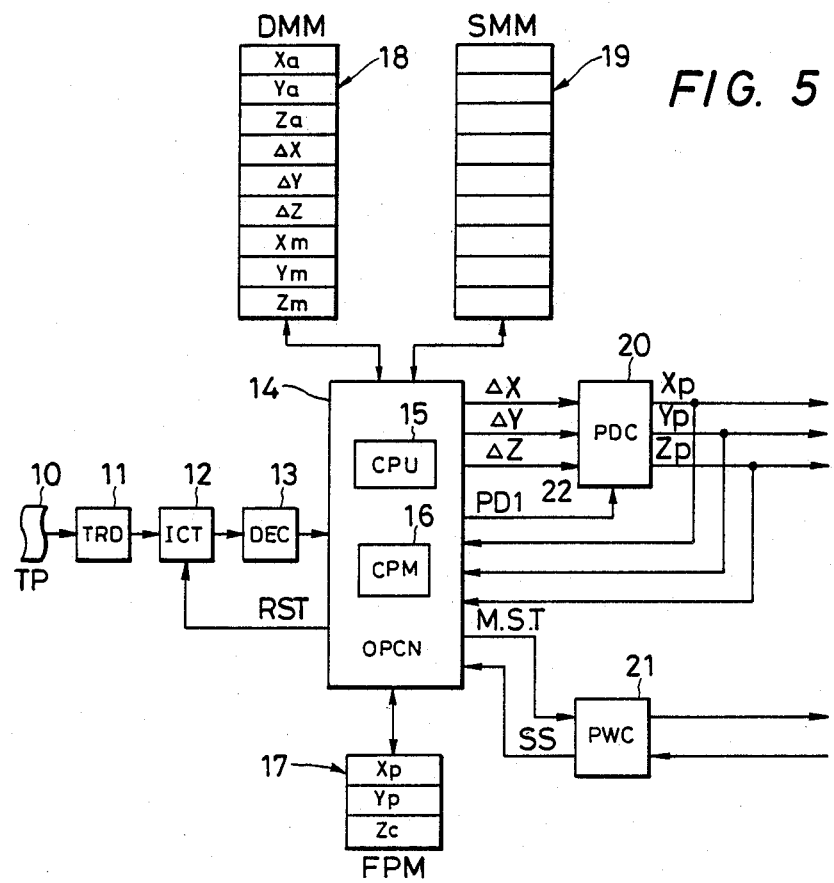
FIG. 5 is a block diagram showing an operation of the present system.

FIG. 5 is a block diagram of an embodiment of the return control system of the present invention. In FIG. 5, reference numeral 10 depicts an NC tape which contains a plurality of numerical control data in the form of punched holes. The control data are readout by a tape reader 11 under the control of an input control circuit 12 which controls the tape reader 11 to cause it to sequentially readout the data from the NC tape 10 and to supply them to a decoder 13. The decoder 13 decodes the numerical control data and supplies decoded data to an operation/control unit (OPCN) 14 if the decoded data is a position instruction $(X_e, Y_e, Z_e)$ or a G function instruction, etc. and to a mechanical side through power electrode circuitry (PWC) if the decoded data is one of other function instructions such as miscellaneous function (M function), spindle speed function (S function) or tool function (T function). The operation/control unit (OPCN) 14 includes a control processing unit (CPU) 15 and a control program memory (CPM) 16, etc.

When an absolute position instruction $X_e$, $Y_3$, $Z_e$ is inputted thereto under, for example, a linear interpolation, the OPCN 14 executes an operation of:

$$Xe - Xa \rightarrow \Delta X, \quad Ye - Ya \rightarrow \Delta Y, \quad Ze - Za \rightarrow \Delta Z \qquad (1)$$

to obtain incremental values $\Delta X$, $\Delta Y$ and $\Delta Z$, where $X_a$, $Y_a$ and $Z_a$ are current coordinate values of the point A on the X, Y and Z axes. Then, the OPCN 14 provides the incremental values $\Delta X$, $\Delta Y$, and $\Delta Z$ to a pulse distributor (PDC) 20 in a next stage and executes the following operation every time the pulse distributor 20 produces distribution pulses Xp, Yp and Zp to update residual amounts of shift Xm, Ym, and Zm and the current position (Xa, Ya, Za).

$$Xm - 1 \rightarrow Xm, \quad Ym - 1 \rightarrow Ym, \quad Zm - 1 \rightarrow Zm \qquad (2)$$

$$Xa \pm 1 \rightarrow Xa, \quad Ya \pm 1 \rightarrow Ya, \quad Za \pm 1 \rightarrow Za \qquad (3)$$

The equations (3) depend upon the direction of electrode movement, with the signs + and − corresponding to the positive and negative directions, respectively. Further, the OPCN 14 operates according to the G function given thereto. That is, when a G function instruction G01 indicates linear interpolation, the OPCN 14 executes the equations (1), (2) and (3) until a clockwise circular interpolation instruciton G02 or a counterclockwise circular interpolation instruction G03 is given. When the G02 or G03 is given, the OPCN 14 executes the circular interpolation with an aid of the CPU 15 under the control of the control program.

The OPCN 14 further executes the return control. That is, when a short-circuit signal is produced by a contact of the electrode with the work, the OPCN 14 controls the return of the electrode under a predetermined control program, which will be described in detail later.

The current position (Xa, Ya, Za) of the electrode, the incremental values $\Delta X$, $\Delta Y$ and $\Delta Z$ and the residual amounts of shifts Xm, Ym and Zm are stored in a data memory (DMM) 18. When a short-circuit occurs, the content of the DMM 18 is sided temporarily to a siding memory (SMM) 19 under the control of the OPCN 14, and after the return control is completed, the sided content is recovered to the data memory DMM 18.

Assuming that an axis along which the electrode is to be advanced to machine the work is the Z axis, an object point memory FPM 17 memorizes Xa and Ya of the coordinates Xa, Ya and Za of the position of the electrode at a time when the G73 instruction is given as position values Xf and Yf of the object point. At this time, the value Zf and the Z axis is calculated as $$Zf = Za + Zc \qquad (4)$$

The electrode is returned to the object point (Xf, Yf, Zf (=Za+Zc)) straightly under the return control.

The length Zc of the return path of the electrode in the machining direction is instructed after the G73 instruction, which is stored in the object point memory FPM 17 together with the values Xf and Yf.

The power electrode circuitry PWC 21 functions to interface between the electric spark machine and the NC device such that the short circuit signal SS is passed therethrough to the NC device.

In FIG. 5, the input control circuit ICT 12 controls the tape reader TRD 11 so that the latter reads out the NC data block by block from the NC tape 1 and supplies them to the operation/control circuit OPCN 14 to cause the latter to execute its numerical control so that a desired spark machining is realized to the work. That is, when an instruction readout from the NC tape is an absolute position instruction (Xe,Ye,Ze), the decoder DEC 13 supplies the position instruction to the operation/control circuit OPCN 14. The OPCN 14 responds to the position (Xe,Ye,Ze) to operate the equation (1) when the mode is linear interpolation according to the G01 instruction. The incremental values $\Delta X$, $\Delta Y$ and $\Delta Z$ obtained by the operation are supplied to the pulse distributor PDC 20 and to the data memory DMM 18 for storage. The values $\Delta X$, $\Delta Y$ and $\Delta Z$ are also set in memory zones as the residual amounts of shift Xm, Ym and Zm. That is, $\Delta X = Xm$, $\Delta Y = Ym$ and $\Delta Z = Zm$. The pulse distributor PDC 20 responds to the incremental values $\Delta X$, $\Delta Y$ and $\Delta Z$ to execute a pulse distribution operation immediately. Distribution pulses Xp, Yp and Zp obtained by the pulse distribution operation are given to a servo unit (not shown) to drive d.c. motors for the respective axes to thereby move the electrode along a programmed path. At the same time, the distribution pulses Xp, Yp and Zp are supplied to the operation/control unit OPCN 14. The OPCN 14 is responsive to the pulses to execute the equations (2) and (3) to update the contents of the memory zone for storage of the current position (Xa,Ya,Za) and the memory zone for storage of the residual amounts of shift (Xm,Ym,Zm). When the content of the latter memory zone becomes Xm=0, Ym=0 and Zm=0, a pulse distribution termination signal PDI is supplied from the OPCN 14 to the pulse distributor PDC 20. At the same time, the OPCN 14 provides a next NC data readout signal RST to cause the input control circuit ICT 12 to read out the NC data in the next block.

When the machining data readout from the NC tape TP is the M, S or T function instruction, the input control circuit ICT 12 provides it through the power circuit PWC 21 to the side of the machine tool. When the latter provides a signal indicative of a completion of mechanical operation based on the function instruction, the OPCN 14 reads a next machining data.

When the G function instruction is read from the NC tape 10, the input control circuit 12 supplies it to the operation/control unit OPCN 14 which performs an operation corresponding to the G function.

Assuming that the G73 function instructs a straight movement of the electrode toward the object point under the return control, the OPCN 14 memorizes it in a memory zone (not shown), i.e., provides "1" in a predetermined memory zone, and simultaneously, memories, in the object point memory FPM 17, a position (Xf,Yf,Zc) where Xf and Yf are the same as Xa and Ya of the current poisition (Xa,Ya,Za) with the advance direction of the electrode being the Z axis and Zc is a returning distance in the opposite direction instructed after the G73 instruction.

When the electrode is brought into contact with the work at the point P in FIG. 3 during machining by moving the electrode along an instructed path after the G73 instruction, the short-circuit signal SS produced thereby is supplied through the power circuit PWC 21 to the operation/control unit OPCN 14. The OPCN 14 responds to the short-circuit signal SS to provide the pulse distribution termination signal PDI to the pulse distributor PDC 20 and to side the content of the data memory DMM 18, i.e., the current position (Xa,Ya,Za), the incremental values (ΔX,ΔY,ΔZ) and the residual amounts of shift (Xm,Ym,Zm), etc. to the siding memory SMM 19.

Incremental values ΔX', ΔY' and ΔZ' from the object point A to the current position at which the short-circuit condition occurred are obtained according to the following equations, which are supplied to the pulse distributor PDC 20 to commence the pulse distribution operation:

$$Xf - Xa \rightarrow \Delta X', \quad Yf - Ya \rightarrow \Delta Y', \quad Zc \rightarrow \Delta Z',$$

upon which the electrode is started to move directly to the object point A and the return movement continues until the short-circuit condition is removed or an advance signal is produced. When the short-circuit condition is removed at a point R in FIG. 4, i.e., the short-circuit signal SS becomes low level, the pulse distribution termination signal PDI is produced to stop the pulse distribution. The current position in the data memory DMM 18 is (Xa',Ya',Za'), at this time, which is the same as that of the point R. Then, the operation/control unit OPCN 14 performs:

$$Xa - Xa' \rightarrow \Delta X'', \quad Ya - Ya' \rightarrow \Delta Y'', \quad Za - Za' \rightarrow \Delta Z'',$$

to obtain incremental values up to the point P which are supplied to the pulse distributor PDC and memorized as the residual amounts of shift Xm(=ΔX''), Ym(=ΔY'') and Zm(=ΔZ''). The pulse distributor PDC 20 responds to the incremental values ΔX'', ΔY'' and ΔZ'' to operate the pulse distribution and supplies distribution pulses Xp, YP and Zp to the servo unit to drive the respective d.c. motors to thereby move the electrode to the point P at which the short-circuit occurred previously. At the same time, these distribution pulses are supplied to the operation/control unit OPCN 14. The latter operates the equations (2) and (3) every time these pulses are supplied to update the current position and the residual amounts of shift. Then, when Xm=0, Ym=0 and Zm=0, i.e., when the electrode reaches the point P, it provides the pulse distribution termination signal PDI to stop the pulse distribution operation. Finally, the current position (Xa,Ya,Za), the incremental values ΔX, ΔY and ΔZ, and the residual amounts of shift Xm, Ym and Zm, etc. which were sided to the siding memory SMM 19 are recovered in the data memory DMM 18 from which the incremental values ΔX, ΔY and ΔZ are inputted to the pulse distributor PDC 20 to move the electrode again along the instructed path to thereby commence the machining operation again.

In the case of the G72 instruction, the return control of the electrode is performed as usual along the path which the electrode experienced for machining when the short-circuit signal SS is produced. That is, the present control system includes a program for returning the electrode directly to the variable object point and a program for returning the electrode along the experienced path, and operates in either of the programs depending upon whether the instruction is G72 or G73.

As mentioned hereinbefore, according to the present invention in which, in addition to the usual return path of the electrode, the electrode can be returned directly to the variable object point which is continuously updated independently from the usual return path, it is possible to remove the short-circuit condition smoothly and, for that reason, it is possible to shorten the machining time with a stable recovery of machining conditions. Further, since the two returning schemes are switchable according to the preparatory function instruction, it is possible to optimize the machining conditions and machining processes.

What is claimed is:

1. A method of electrode return control for an electric spark machine for machining a workpiece with an electrode by moving said electrode with respect to said workpiece, said method being responsive to the occurrence of a short-circuit signal produced upon contact between said electrode and said workpiece to move said electrode in a direction in which said contact condition is broken, comprising the steps of:
    (a) continuously monitoring the progress of the machining operation,
    (b) successively updating a spatial objective point towards which said electrode is to be moved in the event of a shortcircuit signal in accordance with the monitoring of the machining operation progress, and
    (c) selectively moving said electrode away from a surface of said workpiece being machined and either:
        (1) directly toward said updated spatial objective point in a straight line, or (2) back along a path over which said electrode was moved during the machining operation, in response to the occurrence of a short-circuit signal.

2. The method as claimed in claim 1, wherein coordinates of said spatial objective point are determined as coordinates of a point positioned at a predetermined distance from an end point of said electrode on an advance axis thereof when a specific preparatory function is instructed.

3. The method as claimed in claim 1, wherein the moving step selection is performed according to a modal preparatory function instruction.

* * * * *